Jan. 9, 1951            A. C. WILSON            2,537,251
APPARATUS FOR SPRAYING LIQUID
INSECTICIDE FROM AIRPLANES

Filed May 14, 1945                                              4 Sheets—Sheet 1

*Fig. 1.*

*Fig. 2.*

Inventor

Arch C. Wilson,

By Clarence A. O'Brien
and Harvey B. Jacobson
Attorneys

Inventor
Arch C. Wilson,
By Clarence A. O'Brien
and Harvey B. Jacobson
Attorneys

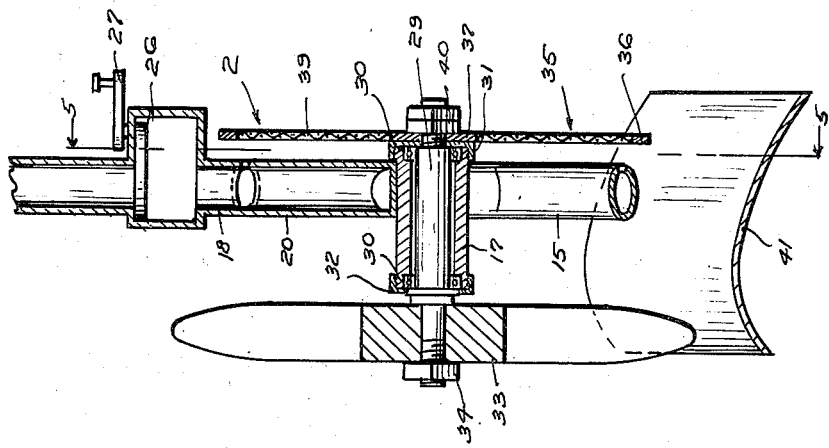
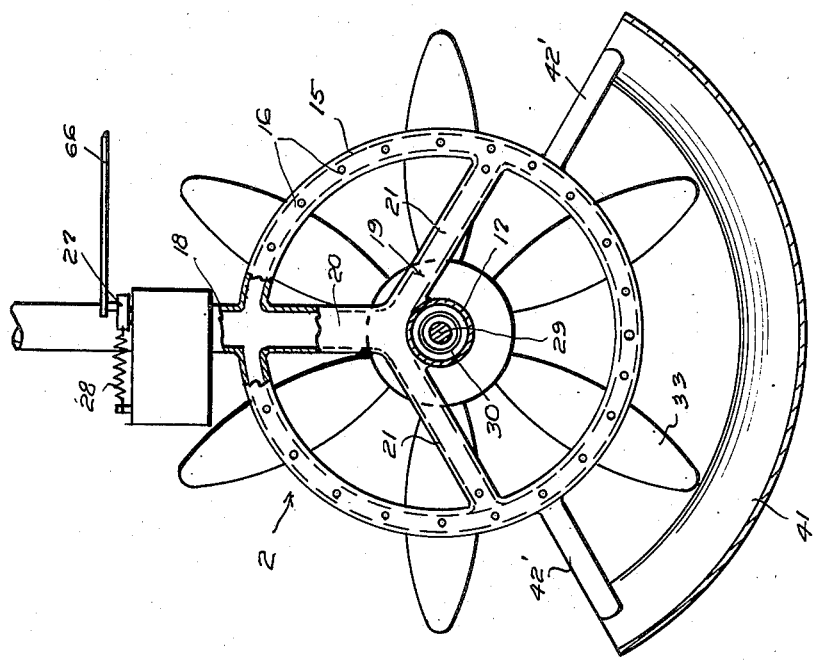

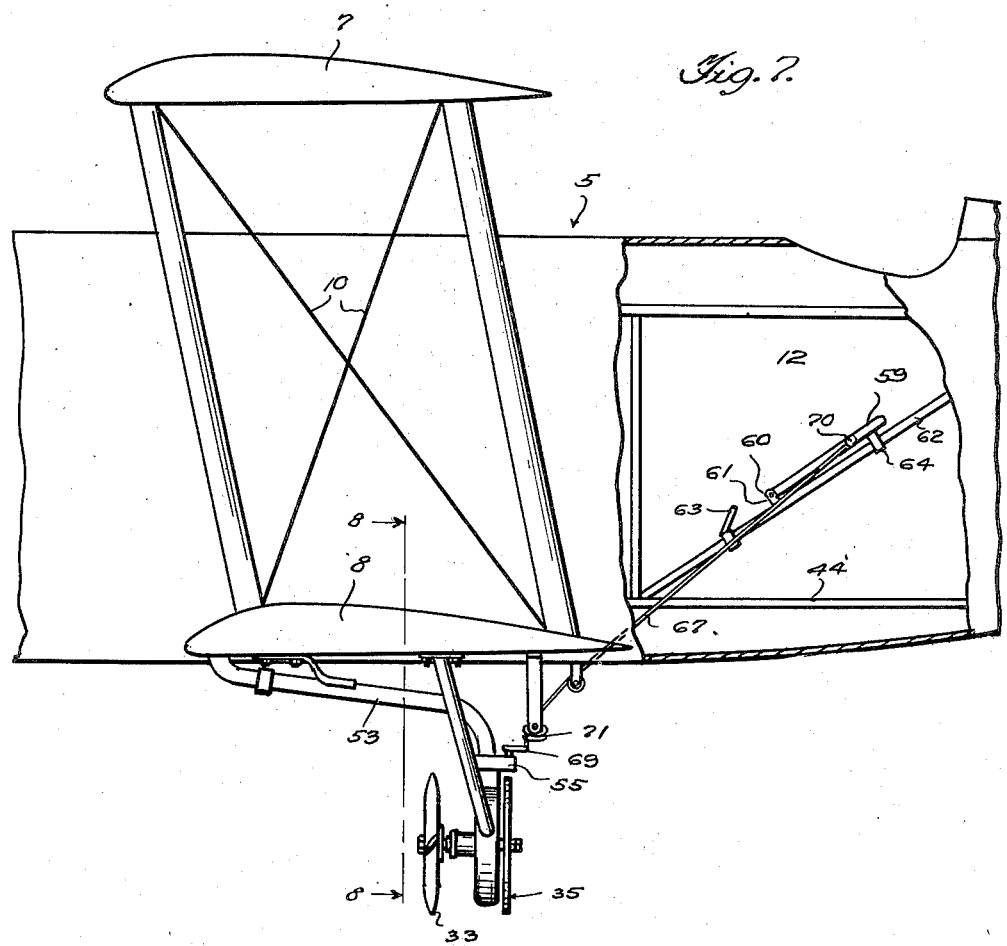
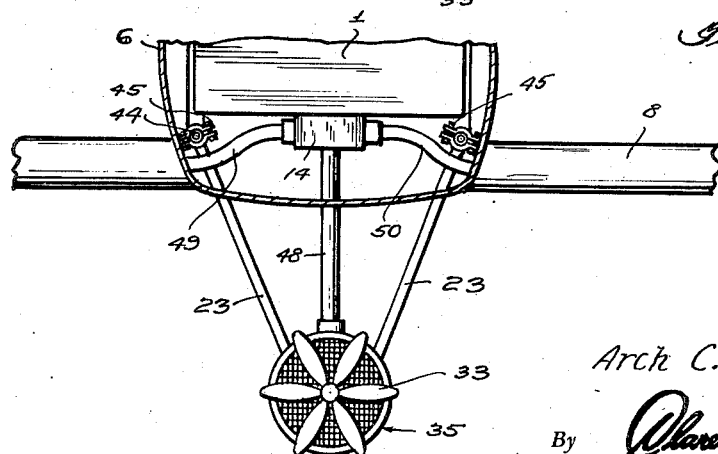

Patented Jan. 9, 1951

2,537,251

UNITED STATES PATENT OFFICE 2,537,251

APPARATUS FOR SPRAYING LIQUID INSECTICIDE FROM AIRPLANES

Arch C. Wilson, West Palm Beach, Fla.

Application May 14, 1945, Serial No. 593,591

2 Claims. (Cl. 244—136)

My invention relates to improvements in apparatus for spraying liquid insecticide from airplanes to destroy and control insect life and fungus growth, and for other similar purposes.

The invention is designed with the primary object in view of providing efficient apparatus of few parts and simple construction adapted for easy incorporation in an airplane without altering the basic structure of the airplane, and which is operative by wind pressure caused by flight of the airplane to discharge liquid insecticide beneath the airplane in finely divided vapor or mist-like form to settle on crops, trees and other growths and eradicate insect pests and the like.

Other and subordinate objects are also comprehended by my invention, all of which, together with the precise nature of my improvements, will be readily understood when the succeeding description and claims are read with reference to the drawings accompanying and forming part of this specification.

Figure 3:
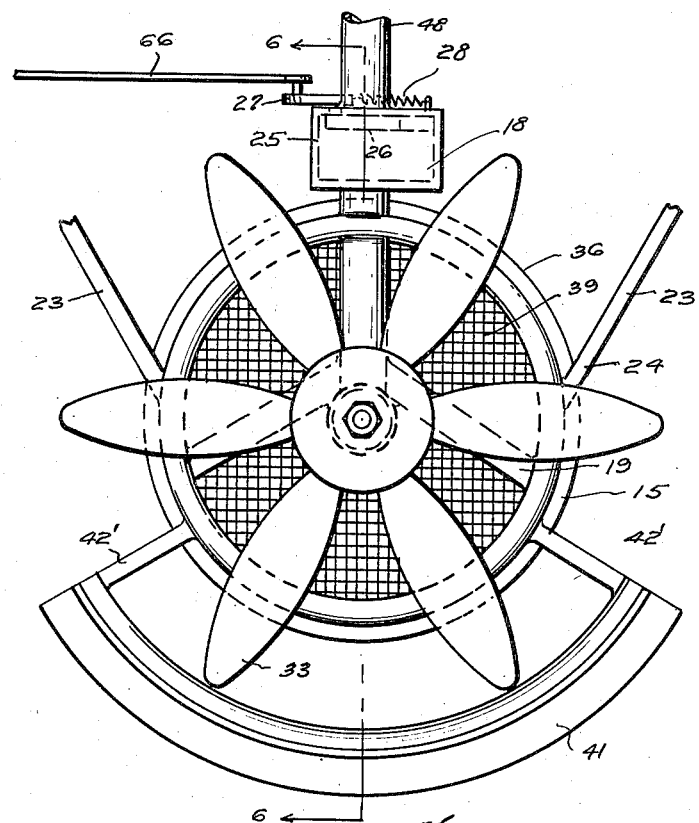
Figure 4:
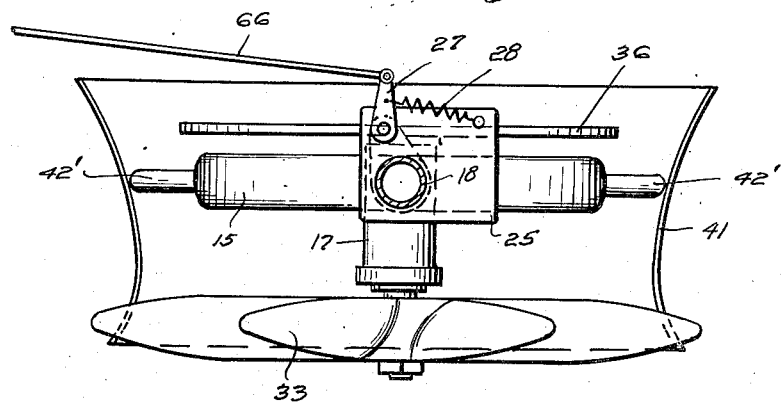

In said drawings:

Figure 1 is a fragmentary view partly in front elevation and partly in transverse section illustrating my invention embodied in an airplane, Figure 2 is a view in transverse section taken on the line 2—2 of Figure 1 and drawn to an enlarged scale, Figure 3 is a view in front elevation of the center liquid discharging and vaporizing unit drawn to an enlarged scale, Figure 4 is a view in plan of the same, Figure 5 is a view in section taken on the line 5—5 of Figure 6, Figure 6 is a view in vertical transverse section taken on the line 6—6 of Figure 3, Figure 7 is a fragmentary view in side elevation, partly broken away and shown in longitudinal section, Figure 8 is a view in vertical transverse section taken on the line 8—8 of Figure 7.

Reference being had to the drawings by numerals, my invention, as illustrated in a preferred form thereof, comprises, as its basic elements, a liquid supply tank 1 for a suitable liquid insecticide, preferably an oil, and a battery of three propeller-driven liquid-discharging and vaporizing units 2, 3, 4 embodied in an airplane 5.

Preferably, although not necessarily, the invention is embodied in a biplane, conventionally illustrated as sufficient for the present purposes, 6 designating the fuselage, 7 the upper wings, 8 the lower wings, 9 the landing gear, 10 the strut wires bracing the wings, and 11 strut rods bracing the wings to the fuselage.

The liquid supply tank is preferably arranged in the forward portion of the fuselage 6 in advance of the cockpit 12, is rectangular with a filler neck 1 at the top thereof, a central sediment trap 14 at the bottom of the same, and may be fixed in place by any suitable means, not shown.

The battery of liquid-discharging and vaporizing units 2, 3, 4 are arranged in a line extending crosswise of the airplane 5, beneath the lower wings 8 and fuselage 6, and rearwardly of the longitudinal center of said wings, said units 2, 4 being just outside the circle described by the airplane propeller, not shown, and the unit 3 being disposed in the longitudinal center plane of the fuselage 6. Thus, there are two side units 2, 4 and the center unit 3 in said battery.

Each of the discharging and vaporizing units 2, 3, 4 is, with exceptions presently noted, a counterpart of the others, and therefore a description of one will suffice for all.

Referring now to Figures 3, 4, 5 and 6, the center liquid-discharging and vaporizing unit 3, for example, comprises a substantially circular, hollow spray ring 15 with its axis extending longitudinally of the airplane 5, the rear side of said ring being provided with circumferentially spaced, jet-forming apertures 16 therein, and said ring having a hub 17 and a top inlet nipple 18. A tubular distributing spider 19 supports said ring 15 in the plane thereof on the hub 17 and is suitably fixed to said hub, as by welding, not shown, said spider 19 providing a radial, vertical branch 20 aligned with the nipple 18 and a pair of diverging branches 21 straddling the hub 17. Branches 20, 21 communicate with said ring 15 at points in substantially 120° angular relation and may also be provided with rear jet-forming apertures therein, as at 22. The spray ring 15 is provided with a pair of preferably hollow hanger rods 23 having lower ends 24 suitably fixed, as by welding, not shown, to opposite sides of said ring.

The inlet nipple 18 depends from the casing 25 of a quick acting valve which may be of any suitable type, for instance, with a gate valve member 26 therein horizontally swingable by a crank arm 27 on top of the casing 25 tensioned by a suitably connected coil spring 28 to swing said member 26 closed. A spindle 29 is rotatably mounted in the hub 17 in end anti-friction bearings 30 retained in said hub 17 by hub caps 31 threaded onto said hub, the spindle 29 having a front end thrust collar 32 thereon opposed to one bearing 30.

A wind-operative propeller 33 is rigidly secured on the front end of the spindle 29 by a nut 34 clamping said propeller 33 between the same and said collar 32.

A disc-like vaporizer, or atomizer, 35 of at least the same diameter as that of the spray ring 15 is provided in the rear of said ring close thereto and which comprises an annular rim 36 connected to a hub 37 by spokes 38, the rim 36 being covered with a disc 39 of reticulated material, such for instance as metal lathing, suitably secured to said rim, spokes and hub. The vaporizer, or atomizer, 35 is fixed on the rear end of the spindle 29 by threading the hub 37 on said spindie and locking the same thereon by lock nuts 40.

An arcuate deflector member 41, arched in cross section toward the spray ring 15, is provided beneath said ring and said propeller 33 and vaporizer, or atomizer, 35, and is fixed to said ring concentrically thereof by a pair of radial arms 42' extending between the ring 15 and the ends of said member 41 and centering said member below said ring. The purpose of the deflector member 41 will presently appear.

The propeller 33, in the case of the center liquid-discharging and vaporizing unit 3, is smaller in diameter than the propellers 42, 43 of the side units 2, 4 because of the fact that the blast from the airplane propeller, not shown, tends to rotate said propeller 33 and thereby cause the same to rotate at a higher speed than the propellers 42, 43. In the case of the side liquid-discharging and vaporizing units 2, 4, no deflector, such as said member 41, is provided for reasons which will presently appear.

In the case of the center liquid-discharging and vaporizing unit 3, the hanger rods 23 are rigidly attached at the upper ends thereof to lower longerons 44 of the fuselage 6 by clamps 45, such as shown in Figure 7, whereas, the corresponding rods 46 of the side liquid-discharging and vaporizing units 2, 4 are similarly attached to longitudinal spars 47 in the lower wings 8 by clamps 48, as shown in Figure 2.

A liquid supply pipe 48, of thin metal tubing, depends from the trap 14 to the top of the valve casing 25 for the center liquid-discharging and vaporizing unit 3, for gravity feed from said supply tank 1 to the valve of which said casing forms a part. Liquid supply hose lines 49, 50 extend from the trap 14 into the lower wings 8 along the leading edges of said wings and are suitably connected, as by couplings 51, 52, to downwardly and rearwardly inclined pipes 53, 54 leading under said wings 8 to the tops of the valve casings 55, 56 of the side liquid-discharging and vaporizing units 2, 4, respectively. The pipes 53, 54 may be suitably connected, at the forward ends thereof, to longitudinal spars 57 in said wings 8 by clamps 58, as shown in Figure 2.

A valve member operating hand lever 59 in the cockpit 12 is pivoted at its lower end, as at 60, to a clamp 61 on a diagonal strut 62 of the fuselage 6 for forward and rearward vertical swinging into valve-opening and closing positions, respectively.

A pair of front and rear stops 63, 64 on said strut 62 establish the opening and closing positions of said hand lever 59. Cables 65, 66, 67 extend from the crank arms 68, 27 and 69 on the valve casings 55, 25, 56, respectively, to a mid point 70 on the hand lever 59 and are trained under suitably arranged pulleys, as at 71, so that rearward swinging of said lever 59 will cause the cables to open the valves operated by said crank arms 68, 27, 69 and in opposition to the springs, as at 28. The arrangement of hand lever 59 and the cables 65, 66, 67 is such that the pull of the cables on said lever in the valve-opening position of the lever is below the pivot 61 of said lever to maintain the same in valve-opening position.

The manner in which the described invention is used and operated will be readily understood.

With the supply tank filled with a liquid insecticide, not shown, the valve-operating lever 59 swung into the described valve-opening position, as shown in Figure 7, and the airplane 5 in flight, the liquid is fed into the spiders 19, and to the spray rings 15 of the described liquid-discharging and vaporizing units 2, 3, 4 by gravity feed to issue rearwardly from the apertures 16, 22 in jet form the jets impinging against the vaporizers, or atomizers, 35. The propellers 33, 42, 43 operating by wind pressure at high velocity cause high speed whirling action of the vaporizers, or atomizers 35, of said units 2, 3, 4 so that the liquid impinging against the reticulated disks 39 is broken up into finely divided, atomized form to be thrown under the action of centrifugal force to the rims 36 and off said rims with a swirling action into space in the form of a mist or fog to settle on whatever growths the airplane 5 is driven over. The deflector member 41 directs liquid away from the fuselage 6 downwardly.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A liquid discharging and spraying unit for use in the relative flow of air caused by flight of an airplane, said unit comprising a hollow ring having one side perforated and disposed downstream of the relative flow of air for discharging liquid in jet form, means for mounting said ring externally on an airplane, a hub connected to said ring, a spindle rotatable in said hub, a propeller fast on said spindle upstream from said ring and arranged to be driven by the relative flow of air, and a vaporizer comprising a disc of reticulated material fast on said spindle downstream from said ring and arranged to impinge upon the liquid discharged in jet form as said disc rotates with said spindle.

2. A liquid discharging and spraying unit for use in the relative flow of air caused by flight of an airplane, said unit comprising a hollow ring having one side perforated and disposed downstream of the relative flow of air for discharging liquid in jet form, means for mounting said ring externally on an airplane, a hub for the ring, a tubular spider connecting said ring to said hub with perforations therein for also discharging liquid in jet form downstream of the relative flow of air, said spider communicating with said ring, a spindle rotatable in said hub, a propeller fast on the spindle upstream from said ring and arranged to be driven by the relative flow of air, and a vaporizer comprising a disc of reticulated material fast on said spindle downstream from said ring and arranged to impinge upon the liquid discharged in jet form as said disc rotates with said spindle.

ARCH C. WILSON.

REFERENCES CITED

The following references are of record in the file of this patent:

UNITED STATES PATENTS

| Number | Name | Date |
|---|---|---|
| 1,835,970 | Savage | Dec. 8, 1931 |
| 2,048,847 | Desmet | July 28, 1936 |
| 2,063,716 | Zellweger | Dec. 8, 1936 |
| 2,076,192 | Carr | Apr. 6, 1937 |
| 2,173,568 | Streif | Sept. 19, 1939 |